United States Patent
Zhao (10) Patent No.: US 12,457,600 B2
(45) Date of Patent: Oct. 28, 2025

(54) RESOURCE ALLOCATION METHOD AND TERMINAL

(71) Applicant: GUANGDONG OPPO MOBILE TELECOMMUNICATIONS CORP., LTD., Dongguan (CN)

(72) Inventor: Zhenshan Zhao, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 496 days.

(21) Appl. No.: 17/970,047

(22) Filed: Oct. 20, 2022

(65) Prior Publication Data
US 2023/0041458 A1    Feb. 9, 2023

Related U.S. Application Data

(63) Continuation of application No. PCT/CN2020/086167, filed on Apr. 22, 2020.

(51) Int. Cl.
*H04W 72/1263* (2023.01)
*H04W 72/20* (2023.01)
(Continued)

(52) U.S. Cl.
CPC ....... *H04W 72/1263* (2013.01); *H04W 72/20* (2023.01); *H04W 72/569* (2023.01); *H04W 92/18* (2013.01)

(58) Field of Classification Search
USPC ....... 370/229, 230, 235, 236, 243, 252, 315, 370/328, 329, 330, 468
See application file for complete search history.

(56) References Cited

U.S. PATENT DOCUMENTS

2015/0071212 A1\* 3/2015 Kim ................ H04W 74/0833
370/329
2018/0027429 A1\* 1/2018 Li ........................ H04W 8/24
455/426.1
(Continued)

FOREIGN PATENT DOCUMENTS

CN    109314841 A    2/2019
CN    110574476 A    12/2019
(Continued)

OTHER PUBLICATIONS

Extended European Search Report dated May 30, 2023 received in European Patent Application No. EP20932732.9.
(Continued)

*Primary Examiner* — Nguyen H Ngo
(74) *Attorney, Agent, or Firm* — Sheppard, Mullin, Richter & Hampton LLP (57) ABSTRACT

The present disclosure relates to a resource allocation method and a terminal. The resource allocation method includes: transmitting, by a first terminal, first information to a second terminal. The first information instructs the second terminal to allocate a sidelink transmission resource to the first terminal. According to an embodiment of the present disclosure, the sidelink transmission resource is allocated by the terminal to reduce interference in sidelink transmissions of individual terminals. In addition, compared with applying for a transmission resource from a network, the method can reduce delay, shorten allocation time, and improve allocation efficiency.

20 Claims, 6 Drawing Sheets

(51) Int. Cl.
*H04W 72/566* (2023.01)
*H04W 92/18* (2009.01)

(56) References Cited

U.S. PATENT DOCUMENTS

| | | | |
|---|---|---|---|
| 2018/0295646 A1* | 10/2018 | Faurie | H04W 72/23 |
| 2019/0082459 A1 | 3/2019 | Faurie et al. | |
| 2019/0166640 A1* | 5/2019 | Wei | H04W 72/52 |
| 2020/0029353 A1* | 1/2020 | Xu | H04W 72/21 |
| 2020/0077352 A1* | 3/2020 | Yu | H04W 56/0025 |

FOREIGN PATENT DOCUMENTS

| | | | |
|---|---|---|---|
| CN | 110679190 A | 1/2020 |
| EP | 4106431 A1 | 12/2022 |
| WO | 2016095119 A1 | 6/2016 |
| WO | 2020056608 A1 | 3/2020 |

OTHER PUBLICATIONS

International Search Report and Written Opinion dated Jan. 20, 2021 in International Application No. PCT/CN2020/086167. English translation attached.

Huawei et al. "Resource allocation for UE-to-Network relay", 3GPP TSG RAN WG1 Meeting #80bis R1-151279, Apr. 10, 2015 (Apr. 10, 2015), pp. 1-3.

\* cited by examiner

FIG. 15

RESOURCE ALLOCATION METHOD AND TERMINAL

CROSS-REFERENCE TO RELATED APPLICATION

This application is a continuation of International Application No. PCT/CN2020/086167 filed on Apr. 22, 2020, which is hereby incorporated by reference in its entirety.

TECHNICAL FIELD

The present disclosure relates to the field of communication, and more particularly, to a resource allocation method and a terminal.

BACKGROUND

Device to Device (D2D) communication is a transmission technology based on Sidelink (SL). Unlike a conventional cellular system in which communication data is received or transmitted via a base station, a D2D system has higher spectral efficiency and lower transmission delay. A Vehicle to Everything (V2X) system uses direct communication, i.e., terminal-to-terminal communication. In a sidelink transmission, a terminal can apply for a transmission resource from a network, in which case network delay exists; or the terminal can select a transmission resource autonomously, in which case a conflict in the selected transmission resource is likely to occur, resulting in interference in sidelink transmissions of individual terminals. Therefore, for the sidelink transmission, it is a problem that needs to be solved regarding how to reasonably allocate a transmission resource.

SUMMARY

Embodiments of the present disclosure provide a resource allocation method and a terminal, capable of allocating a sidelink transmission resource by the terminal to reduce interference in sidelink transmissions of individual terminals.

According to an embodiment of the present disclosure, a resource allocation method is provided. The method includes: transmitting, by a first terminal, first information to a second terminal. The first information instructs the second terminal to allocate a sidelink transmission resource to the first terminal.

According to an embodiment of the present disclosure, a resource allocation method is provided. The method includes: receiving, by a second terminal, first information from a first terminal; and allocating, by the second terminal based on the first information, a sidelink transmission resource to the first terminal.

According to an embodiment of the present disclosure, a terminal is provided. The terminal includes: a transmitting unit configured to transmit first information to a second terminal. The first information instructs the second terminal to allocate a sidelink transmission resource to a first terminal.

According to an embodiment of the present disclosure, a terminal is provided. The terminal includes: a receiving unit configured to receive first information from a first terminal; and an allocation unit configured to allocate, based on the first information, a sidelink transmission resource to the first terminal.

According to an embodiment of the present disclosure, a terminal is provided. The terminal includes: a memory having a computer program stored thereon; and a processor configured to invoke and execute the computer program stored in the memory to perform the resource allocation method as described above.

According to an embodiment of the present disclosure, a chip is provided. The chip is configured to implement the resource allocation method as described above.

Specifically, the chip includes: a processor configured to invoke and execute a computer program from a memory to cause an apparatus provided with the chip to perform the resource allocation method as described above.

According to an embodiment of the present disclosure, a computer-readable storage medium is provided. The computer-readable storage medium stores a computer program. The computer program causes a computer to perform the resource allocation method as described above.

According to an embodiment of the present disclosure, a computer program product is provided. The computer program product includes computer program instructions. The computer program instructions cause a computer to perform the resource allocation method as described above.

According to an embodiment of the present disclosure, a computer program is provided. The computer program, when executed by a computer, causes the computer to perform the resource allocation method as described above.

According to an embodiment of the present disclosure, the sidelink transmission resource is allocated by the terminal to reduce interference in sidelink transmissions of individual terminals. In addition, compared with applying for a transmission resource from a network, the method can reduce delay, shorten allocation time, and improve allocation efficiency.

DESCRIPTION OF EMBODIMENTS

Technical solutions according to embodiments of the present disclosure will be described below in combination with accompanying drawings of the embodiments of the present disclosure.

The technical solutions according to the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), Wireless Fidelity (WiFi), a next-generation (5th-Generation, 5G) communication system, or other communication systems.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Optionally, the communication system in the embodiments of the present disclosure may be applied to a Carrier Aggregation (CA) scenario, a Dual Connectivity (DC) scenario, or a Standalone (SA) network deployment scenario.

The embodiments of the present disclosure do not limit a spectrum to which they are applied. For example, the embodiments of the present disclosure may be applied to a licensed spectrum or an unlicensed spectrum.

The embodiments of the present disclosure are described in conjunction with a network device and a terminal device. Here, the terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, a user apparatus, etc. The terminal device may be a STATION (ST) in a WLAN, a cellular phone, a cordless phone, a Session Initiation Protocol (SIP) phone, a Wireless Local Loop (WLL) station, a Personal Digital Assistant (PDA) device, a handheld device having a wireless communication function, a computing device or other processing devices connected to a wireless modem, a vehicle-mounted device, a wearable device, and a next-generation communication system, e.g., a terminal device in an NR network or a terminal device in a future-evolved Public Land Mobile Network (PLMN) network.

By way of example but not limitation, in the embodiments of the present disclosure, the terminal device may also be a wearable device. The wearable device may also be called a wearable smart device, which is a general term for devices that are wearable and developed by applying wearable technology to intelligently design daily wears, such as glasses, gloves, watches, clothing, shoes, etc. A wearable device is a portable device that is worn directly on the body or integrated into a user's clothing or accessory. The wearable device is not only a hardware device, but also realizes powerful functions through software support, data interaction, and cloud interaction. In a broad sense, wearable smart devices include a fully-functioned, large-size device that can achieve all or partial functions without relying on a smart phone, e.g., a smart watch or a pair of smart glasses, and a device that only focuses on a certain type of application function and needs to cooperate with other devices such as a smartphone, e.g., various types of smart bracelets and smart jewelry that monitor physical signs.

The network device may be a device configured to communicate with a mobile device, such as an Access Point (AP) in a WLAN, a Base Transceiver Station (BTS) in a GSM or a CDMA, a base station such as NodeB (NB) in a WCDMA, a base station such as Evolutional Node B (eNB or eNodeB) in an LTE, a relay station or an access point, a vehicle-mounted device, a wearable device, a network device (gNB) in an NR network, a network device in a future-evolved PLMN network, etc.

In the embodiments of the present disclosure, the network device provides services for a cell, and a terminal device communicates with the network device through transmission resources (for example, frequency domain resources, or spectrum resources) used by the cell. The cell may be a cell corresponding to the network device (e.g., a base station). The cell can belong to a macro base station, or belong to a base station corresponding to a small cell. Here, the small cell may include a metro cell, a micro cell, a pico cell, a femto cell, etc. These small cells feature small coverage and low transmit power and are suitable for providing high-speed data transmission services.

Figure 1:
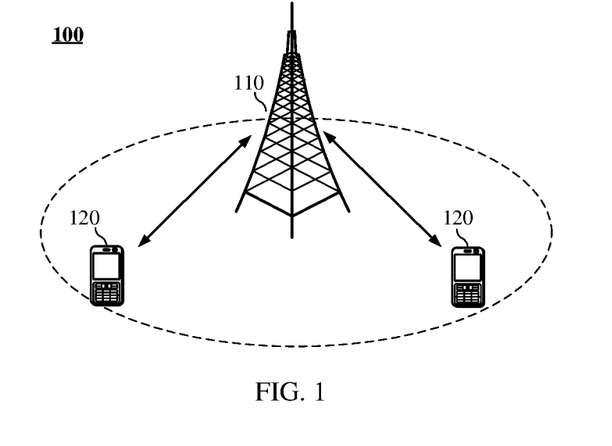
FIG. 1 is a schematic diagram showing an application scenario according to an embodiment of the present disclosure.

FIG. 1 exemplarily illustrates a communication system. The communication system includes one network device 110 and two terminal devices 120. Optionally, the communication system 100 may include a plurality of network devices 110. Each network device 110 has a coverage which may include another number of terminal devices 120. The embodiments of the present disclosure are not limited in this regard.

Optionally, the communication system 100 may also include other network entities such as a Mobility Management Entity (MME) and an Access and Mobility Management Function (AMF). The embodiments of the present disclosure are not limited to any of these examples.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

Figure 2A:
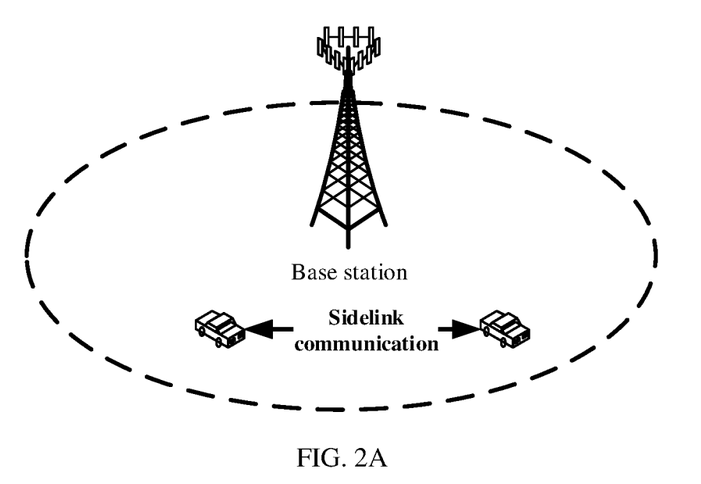
FIG. 2A is a schematic diagram showing sidelink communication within network coverage.
Figure 2B:
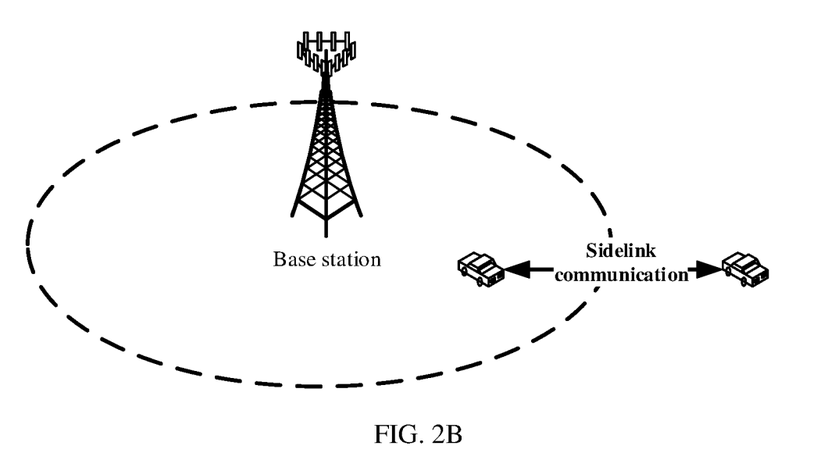
FIG. 2B is a schematic diagram showing sidelink communication under partial network coverage.
Figure 2C:
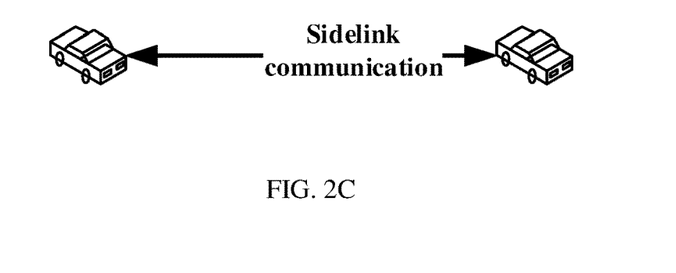
FIG. 2C is a schematic diagram showing sidelink communication outside network coverage.

Sidelink communication may be categorized into, based on network coverage of a terminal performing communication, sidelink communication within the network coverage, sidelink communication under partial network coverage, and sidelink communication outside the network coverage, as illustrated in FIG. 2A, FIG. 2B, and FIG. 2C.

In a case of the sidelink communication within the network coverage, all terminals performing the sidelink communication are within coverage of a same base station. Therefore, all these terminals may perform, by receiving configuration signaling from a base station, the sidelink communication based on a same sidelink configuration.

In a case of the sidelink communication under partial network coverage, some of the terminals performing the sidelink communication are (is) within the coverage of the base station, can receive the configuration signaling of the base station and perform the sidelink communication based on the configuration of the base station. However, a terminal outside the network coverage is unable to receive the configuration signaling of the base station. In this case, the terminal outside the network coverage may determine, based on pre-configuration information and information that is carried on a Physical Sidelink Broadcast Channel (PSBCH) transmitted by the terminal(s) within the network coverage, a sidelink configuration to perform the sidelink communication.

In s case of the sidelink communication outside the network coverage, all terminals performing the sidelink communication are located outside the network coverage and determine, based on pre-configuration information, a sidelink configuration to perform the sidelink communication.

The V2X system uses direct communication, i.e., terminal-to-terminal communication. In the 3rd Generation Partnership Project (3GPP) protocol, the V2X system has two modes of transmission: a first mode and a second mode.

First mode: a transmission resource of the terminal is allocated by a network, e.g., a base station gNB. The terminal transmits data on sidelink based on the resource allocated by the base station. The base station may allocate a resource for a single transmission or a resource for a semi-persistent transmission to the terminal. As illustrated in FIG. 2A, the terminal is located within the network coverage, and the network allocates a transmission resource used for a sidelink transmission to the terminal.

Second mode: the terminal selects, from a resource pool, a resource for data transmission. As illustrated in FIG. 2C, the terminal is located outside coverage of a cell. In this case, the terminal autonomously selects, from a pre-configured resource pool, a transmission resource for the sidelink transmission. Alternatively, as illustrated in FIG. 2A, the terminal autonomously selects, from a network-configured resource pool, a transmission resource for the sidelink transmission.

In NR-V2X, autonomous driving may be supported. Therefore, higher requirements are posed for data interaction between vehicles, such as higher throughput, lower delay, higher reliability, greater coverage, more flexible resource allocation, or the like.

Figure 3A:
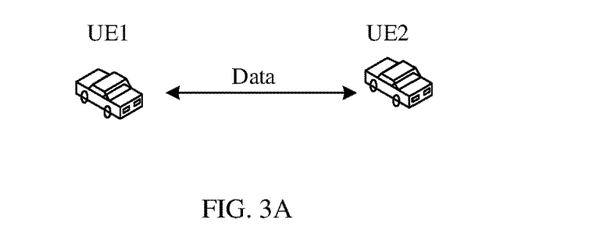
FIG. 3A is a schematic diagram showing a unicast transmission.
Figure 3B:
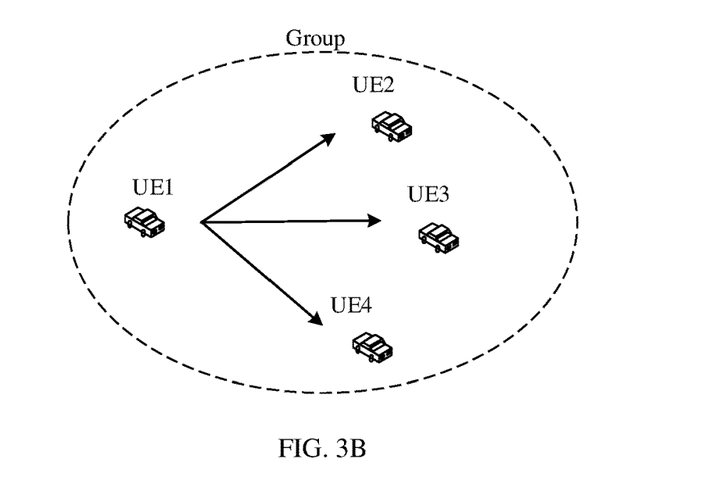
FIG. 3B is a schematic diagram showing a multicast transmission.
Figure 3C:
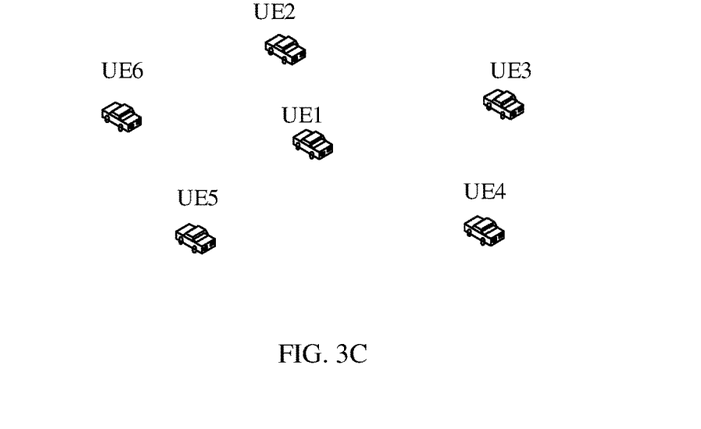
FIG. 3C is a schematic diagram showing a broadcast transmission.

In LTE-V2X, a broadcast transmission manner is supported. In NR-V2X, unicast and multicast transmission manners are introduced. For the unicast transmission manner, a receiving end includes only one terminal. As illustrated in FIG. 3A, a unicast transmission is performed between UE1 and UE2. For the multicast transmission manner, a receiving end refers to all terminals within a same communication group or all terminals within a certain transmission distance. As illustrated in FIG. 3B, UE1, UE2, UE3, and UE4 form one communication group, in which UE1 transmits data and all other terminals within the group are receiver terminals. For a broadcast transmission manner, the receiving end is any terminal around a transmitter terminal. As illustrated in FIG. 3C, UE1 is a transmitter terminal and other terminals around UE1, i.e., UE2-UE6, are all receiver terminals.

Figure 4:
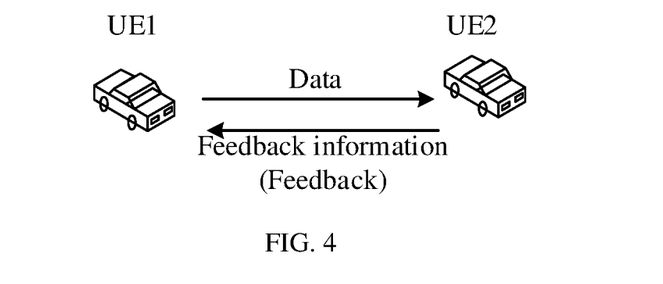
FIG. 4 is a schematic diagram showing a sidelink feedback.

To improve reliability, a sidelink feedback channel is introduced to NR-V2X. For example, as illustrated in FIG. 4, for the unicast transmissions, the transmitter terminal transmits sidelink data (e.g., including a Physical Sidelink Control Channel (PSCCH) and a Physical Sidelink Shared Channel (PSSCH)) to a receiver terminal; and the receiver terminal transmits Hybrid Automatic Repeat reQuest (HARQ) feedback information to the transmitter terminal for the transmitter terminal to determine, based on the feedback information from the receiver terminal, whether a retransmission is necessary. Here, HARQ feedback information is carried on the sidelink feedback channel such as a Physical Sidelink Feedback Channel (PSFCH).

Sidelink feedback may be activated or de-activated by the pre-configuration information or network configuration information. When the sidelink feedback is activated, the receiver terminal receives the sidelink data transmitted by the transmitter terminal and provides, based on a detection result, feedback of HARQ Acknowledgement (ACK) or Negative Acknowledgement (NACK) to the transmitter terminal. The transmitter terminal determines to transmit retransmission data or new data based on feedback information from the receiver terminal. When the sidelink feedback is de-activated, the receiver terminal does not need to transmit the feedback information, and the transmitter terminal usually transmits data by a blind retransmission. For example, the transmitter terminal transmits each piece of sidelink data K times, instead of determining, based on the feedback information from the receiver terminal, whether to transmit the retransmission data.

Figure 5:
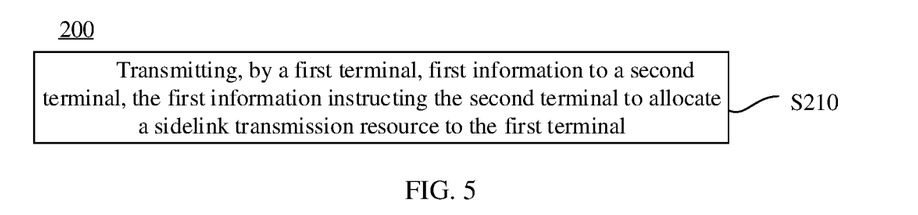
FIG. 5 is a schematic flowchart illustrating a method for processing sidelink feedback information according to an embodiment of the present disclosure.

FIG. 5 is a schematic flowchart illustrating a resource allocation method 200 according to an embodiment of the present disclosure. The method may optionally be, but is not limited to being, applied in the system as illustrated in FIG. 1. The method may at least include a part of the following content.

At S210, a first terminal transmits first information to a second terminal. The first information instructs the second terminal to allocate a sidelink transmission resource to the first terminal.

In an application scenario, in sidelink communication, a plurality of terminals may form one communication group. In the communication group, one terminal may be determined as a central control node, which is also called a group-head terminal. The central control node may have functions of: establishment and maintenance of the communication group; joining and leaving of a group member; allocation, coordination, and scheduling of resources, allocation of a sidelink transmission resource to another terminal, and reception of sidelink feedback information from another terminal; and coordination of resources with another communication group, etc. To allocate the sidelink transmission resource to another terminal, the central control node may obtain information such as a resource request of another terminal, a Buffer Status Report (BSR), and a period of sidelink data to be transmitted.

Figure 6:
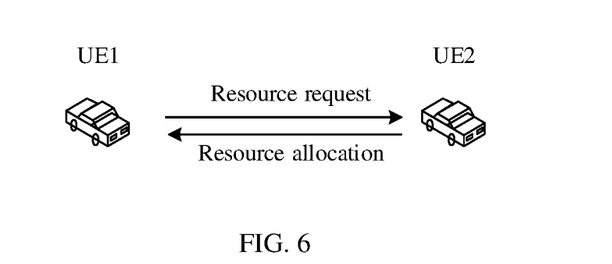
FIG. 6 is a schematic diagram showing allocating a sidelink resource.

For example, as illustrated in FIG. 6, a communication group includes a first terminal UE1 and a second terminal UE2. The first terminal is a group member requesting resource allocation, and the second terminal is a central control node or a group-head terminal. The first terminal may transmit first information to the second terminal. The first information assists the second terminal in allocating a sidelink transmission resource to the first terminal. After receiving the first information, the second terminal may allocate, based on the first information, the sidelink transmission resource to the first terminal. The second terminal transmits, to the first terminal, the sidelink transmission resource allocated to the first terminal. The first terminal may use the sidelink transmission resource to transmit data, such as to transmit sidelink data to a third terminal.

With the resource allocation method according to the embodiment of the present disclosure, the sidelink transmission resource is allocated by the terminal to reduce interference in the sidelink transmissions of individual terminals. For example, a plurality of terminals can form one communication group. One terminal in the communication group acts as the group-head terminal or the central control node. The sidelink transmission resource can be allocated to each group-member terminal by the group-head terminal to avoid the interference in the sidelink transmissions of respective group-member terminals. In addition, compared with applying for a transmission resource from a network, allocating the sidelink transmission resource to the group-member terminal by the group-head terminal can reduce delay, shorten allocation time, and improve allocation efficiency.

Optionally, in an embodiment of the present disclosure, the first information includes a Scheduling Request (SR).

The SR is resource request information that may be transmitted by the first terminal to the second terminal when the first terminal has sidelink data to be transmitted. The SR requests a sidelink transmission resource from the second terminal. The second terminal may obtain the resource request information of the first terminal based on the SR to allocate the sidelink transmission resource to the first terminal.

For example, the first terminal transmits a sidelink feedback channel, e.g., the PSFCH, to the second terminal. The sidelink feedback channel carries the resource request information, i.e., the SR.

Optionally, in an embodiment of the present disclosure, the first information further includes a BSR.

Specifically, the first terminal transmits the BSR to the second terminal to indicate a buffer status of the first terminal, such as a buffer size and a corresponding logical channel identity. The second terminal may allocate, based on the buffer size indicated by the BSR, a transmission resource of an appropriate size to the first terminal.

Optionally, in an embodiment of the present disclosure, the first information further includes relevant information of sidelink data to be transmitted by the first terminal.

Optionally, in an embodiment of the present disclosure, the relevant information of the sidelink data to be transmitted by the first terminal includes at least one of: period information of the sidelink data to be transmitted; delay information of the sidelink data to be transmitted; reliability information of the sidelink data to be transmitted; priority information of the sidelink data to be transmitted; or an information size of the sidelink data to be transmitted.

The relevant information of the sidelink data to be transmitted may be transmitted to the second terminal either along with the SR or the BSR or separately. Examples of the relevant information of the sidelink data to be transmitted of these types are described below.

Example 1: when the sidelink data to be transmitted by the first terminal is a periodic service, an attribute parameter of the sidelink data to be transmitted, e.g., a period of the sidelink data to be transmitted may be transmitted to the second terminal. The second terminal may allocate a periodic transmission resource or a semi-persistent transmission resource, etc., to the first terminal to prevent the first terminal from frequently requesting the transmission resource from the second terminal, thereby reducing signaling overhead of the sidelink.

Example 2: when the first terminal applies for a transmission resource from the second terminal, the first terminal may transmit the delay information, i.e., a delay budget of the sidelink data to be transmitted to the second terminal. The second terminal may allocate a transmission resource meeting the delay requirement to the first terminal. Therefore, it is possible to avoid a situation where the allocated sidelink transmission resource becomes available or invalid due to a time domain position corresponding to the allocated sidelink transmission resource exceeding the delay requirement.

Example 3: when the first terminal applies for a transmission resource from the second terminal, the first terminal may transmit the reliability information of the sidelink data to be transmitted to the second terminal. The second terminal may allocate a transmission resource to the first terminal based on a reliability requirement corresponding to the reliability information. For example, for high-reliability data, a plurality of sidelink transmission resources may be allocated or a sidelink feedback mechanism may be enabled/turned active; and for low-reliability data, the sidelink feedback mechanism may be disabled/turned deactive.

Example 4: the first terminal transmits the priority information of the sidelink data to be transmitted to the second terminal to assist the second terminal in allocating a sidelink transmission resource to the first terminal. For example, in a case of limited transmission resources, the second terminal prioritizes allocation of a sidelink transmission resource to data with high priority, or allocates more transmission resources, more transmission opportunities, or the like to the data with high priority.

Example 5: the first terminal transmits, to the second terminal, indication information indicating the information size (which may also be referred to as a message size) of the sidelink data to be transmitted. The second terminal may allocate, based on the indication information, a corresponding transmission resource that is sufficient to carry the information size to the first terminal.

Optionally, in an embodiment of the present disclosure, the first information further includes terminal assistance information.

Optionally, in an embodiment of the present disclosure, the terminal assistance information (e.g., UeAssistanceInformation) includes at least one of: a bandwidth supported by the first terminal; a number of carriers supported by the first terminal; a number of channels supported by the first terminal; a maximum number of antenna ports supported by the first terminal; a maximum number of transmission layers of the first terminal; a modulation level supported by the first terminal; or a capability level of the first terminal.

For example, the terminal assistance information may include the bandwidth supported by the first terminal. When the second terminal allocates a frequency domain resource to the first terminal, a size of allocated frequency domain resource needs to be smaller than or equal to a size of the bandwidth that may be supported by the first terminal.

For example, the terminal assistance information may include the number of carriers supported by the first terminal. The second terminal may allocate, based on the number of carriers supported by the first terminal, the sidelink transmission resource to the first terminal on one or more carriers. Therefore, a transmission rate of the first terminal can be improved.

For example, the terminal assistance information may include the number of channels supported by the first terminal, e.g., one channel corresponding to a transmission bandwidth of 20 MHz. Based on such information, the second terminal can determine a maximum bandwidth that may be supported by the first terminal, thereby allocating a frequency domain resource of a corresponding size to the first terminal.

For example, the terminal assistance information may include the maximum number of antenna ports supported by the first terminal, which corresponds to a maximum number of layers on which a transmission is possible. For example, when two antenna ports are supported, two data layers supporting the transmission are provided. The transmission rate of the first terminal increases as the number of antenna ports supported by the first terminal increases.

For example, the terminal assistance information may include the maximum number of transmission layers of the first terminal. The second terminal may allocate a transmission resource to the first terminal based on a number of transmission layers supported by the first terminal. For example, assuming that data to be transmitted by the first terminal has 1,000 bytes, the second terminal needs to allocate ten Physical Resource Blocks (PRBs) to the first terminal when the first terminal supports a transmission on a maximum of one layer; and the second terminal may allocate five PRBs to the first terminal when the first terminal supports a transmission on a maximum of two layers. The first terminal uses a two-layer transmission to transmit 1,000 bytes on five PRBs.

For example, the terminal assistance information may include the modulation level supported by the first terminal. The second terminal may allocate a sidelink transmission resource to the first terminal based on a maximum modulation level supported by the first terminal. For example, when the first terminal supports a maximum modulation level of 16 Quadrature Amplitude Modulation (QAM), the second terminal needs to allocate, to the first terminal, ten PRBs for transmitting the data to be transmitted by the first terminal. When the first terminal may support a modulation level of 256 QAM, the second terminal may allocate, to the first terminal, five PRBs for transmitting the data to be transmitted by the first terminal.

For example, the capability level of the terminal may include: whether the terminal is a power-limited terminal; whether the terminal is a power-saving terminal; whether the terminal is a low-power-consumption terminal; or the like.

Optionally, in an embodiment of the present disclosure, the first information further includes an available resource set.

For example, the available resource set may include a set of available transmission resources that are obtained, by the first terminal based on listening, from the resource pool. When the second terminal allocates the sidelink transmission resource to the first terminal, interferences sensed by the second terminal and the first terminal may be different due to different positions of the second terminal and the first terminal. To assist the second terminal in allocating the sidelink transmission resource to the first terminal, the first terminal may transmit an available transmission resource set to the second terminal. The second terminal may select a transmission resource from the available transmission resource set and allocate the transmission resource to the first terminal.

The available resource set may include, for example, channel information, frequency band information, interlace PRB information, slot information, etc.

Optionally, in an embodiment of the present disclosure, the first information further includes an unavailable resource set.

For example, the unavailable resource set may include a set of unavailable transmission resources that are obtained, by the first terminal based on listening, from the resource pool, or may be determined based on a status in which the first terminal performs a sidelink transmission with another terminal. Similar to the above example, the first terminal may also transmit the unavailable resource set to the second terminal to prevent the second terminal from allocating any transmission resource in the unavailable resource set to the first terminal.

For example, the first terminal performs a unicast sidelink transmission with each of the third terminal and a fourth terminal, and is informed that the fourth terminal is about to transmit sidelink data to the first terminal at a slot m. When the first terminal applies, from the second terminal, for a sidelink transmission resource for transmitting sidelink data to the third terminal, the first terminal may transmit a transmission resource set corresponding to the slot m to the second terminal, so as to prevent the second terminal from allocating any transmission resource on the slot m to the first terminal. In this way, the first terminal may be prevented from not only transmitting data but also receiving data on the slot, thereby avoiding a half-duplex problem.

Optionally, in an embodiment of the present disclosure, the first information further includes a Channel Busy Ratio (CBR).

For example, the first terminal may measure the CBR that reflects a busy ratio of a transmission channel or a transmission resource, including a channel occupied by intra-system users (e.g., users based on sidelink transmission technology) or inter-system users (e.g., WiFi users).

Optionally, in an embodiment of the present disclosure, the first information further includes power information.

Optionally, in an embodiment of the present disclosure, the power information includes at least one of: information on maximum transmission power of the first terminal; information on power that the first terminal expects to receive; or information on power headroom of the first terminal.

For example, the information on the maximum transmission power of the first terminal may be 23 dBm (decibel relative to one milliwatt).

For example, after receiving information on power that the first terminal expects to receive, the second terminal may determine, based on the information and a path loss of the sidelink, transmission power corresponding to transmitting the sidelink data or resource allocation information to the first terminal.

For example, after receiving information on power headroom of the first terminal, the second terminal may adjust transmission power of the first terminal based on the information. The transmission power at which the first terminal transmits the sidelink data may be controlled by the second terminal, and the second terminal may increase or decrease the transmission power of the first terminal. The first terminal reports the power headroom to the second terminal, in such a manner that the second terminal may obtain the power headroom of the first terminal. In this way, the second terminal may know whether the transmission power of the first terminal may be increased, or how much the transmission power may be increased. For example, the first terminal transmits the maximum transmission power (23 dBm) to the second terminal, the second terminal allocates a first sidelink transmission resource to the first terminal, and the first terminal transmits sidelink data at 17 dBm on the first sidelink transmission resource. When the first terminal reports the power headroom of 6 dBm to the second terminal, the second terminal may know that a power adjustment range of 6 dBm is available for the first terminal. Further, the second terminal may know that the transmission power of the first terminal is 17 dBm based on the received information on the maximum transmission power of 23 dBm of the first terminal.

Optionally, in an embodiment of the present disclosure, the first information further includes destination address information (which may also be referred to as a destination identity). For example, the destination address information may include information on a receiving end corresponding to data to be transmitted by the first terminal.

Optionally, in an embodiment of the present disclosure, the destination address information includes an identifier of a third terminal. The third terminal is a receiver terminal of sidelink data to be transmitted by the first terminal.

Figure 7:
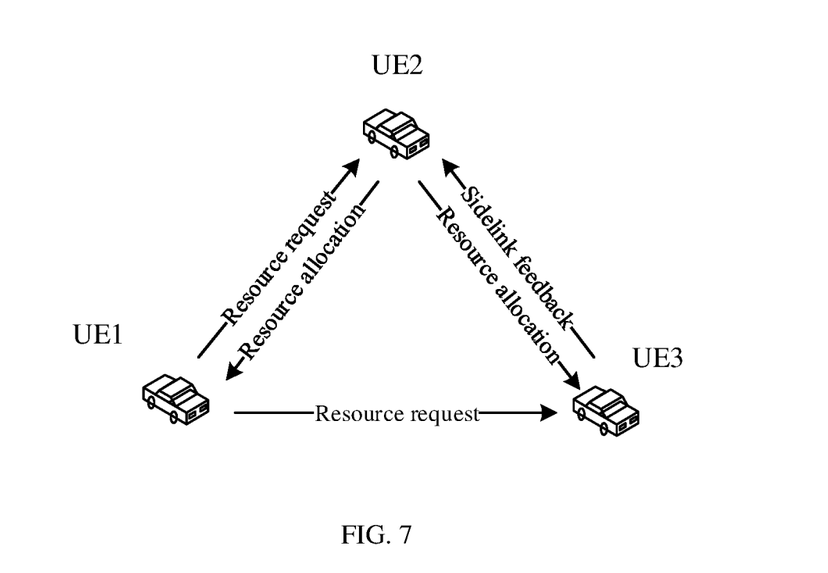
FIG. 7 is a schematic diagram showing allocating a sidelink resource using destination address information.

Specifically, as illustrated in FIG. 7, the first terminal may transmit the information on the receiving end corresponding to the data to be transmitted to the second terminal. For example, in the case in which the first terminal desires to transmit sidelink data to the third terminal, the first terminal transmits, to the second terminal, a destination address corresponding to a transmission of the sidelink data, i.e., the identifier of the third terminal, when requesting a transmission resource from the second terminal. The second terminal allocates a sidelink transmission resource to the first terminal. When sidelink feedback information is enabled, the second terminal may allocate, to the third terminal, a transmission resource for transmitting the sidelink feedback information. In this way, the third terminal may transmit the sidelink feedback information corresponding to the sidelink data transmitted by the first terminal directly to the second terminal, instead of transmitting the sidelink feedback information to the first terminal and making the first terminal transmit the sidelink feedback information to the second terminal, thereby reducing the transmission delay and overhead of the transmission resource.

Optionally, in an embodiment of the present disclosure, the first information further includes synchronization source information.

Optionally, in an embodiment of the present disclosure, the synchronization source information includes at least one of a type, reliability, and a measurement result of a synchronization source of the first terminal.

For example, the type of the synchronization source may include: a Global Navigation Satellite System (GNSS); a base station such as a gNB/eNB; a terminal such as a UE, etc. The first terminal may also transmit, to the second terminal, indication information for determining whether the first terminal uses the second terminal as the synchronization source.

In addition, the first terminal may also transmit, to the second terminal, information indicating whether the synchronization source is reliable or a measurement result based on the synchronization source. For example, when the gNB is determined as the synchronization source, the first terminal may report to the second terminal a measurement result that is based on a Synchronization Signal Block (SSB), e.g., a Reference Signal Receiving Power (RSRP). For example, when the second terminal is determined as the synchronization source, the first terminal may report to the second terminal a measurement result RSRP that is based on a Sidelink SSB (S-SSB) transmitted by the second terminal.

Optionally, in an embodiment of the present disclosure, the first information is carried by at least one of: Sidelink Control Information (SCI); a Physical Sidelink Feedback Channel (PSFCH); PC5-Radio Resource Control (RRC) signaling; or a Media Access Control (MAC) Control Element (CE).

Specifically, in NR-V2X, the SCI may include first-order SCI and second-order SCI. Here, the first-order SCI is carried on the PSCCH and is used to transmit information for scheduling the PSSCH, such as a transmission resource of the PSSCH, priority information, reserved resource indication information, a Modulation and Coding Scheme (MCS), a Demodulation Reference Signal (DMRS) pattern, the number of antenna ports, etc. The second-order SCI is used to transmit information for demodulating the PSSCH, such as a HARQ process number, a New Data Indicator (NDI), transmitter identity (ID) information, target-end ID information, sidelink feedback indication information, etc. The second-order SCI may be multiplexed with the sidelink data. For example, the second-order SCI is transmitted together with the PSSCH, is mapped around PSSCH DMRS symbols, and is demodulated based on the PSSCH DMRS.

For example, the above resource request information SR corresponds to one bit and is carried in the first-order SCI or the second-order SCI.

In multicast, information may be interacted between the group-head terminal and group members via the PC5-RRC signaling. The first information may be carried in the PC5-RRC signaling. Here, PC5 is a connection interface between terminals.

In addition, the first information may be carried in the MAC CE of the sidelink data.

Figure 8:
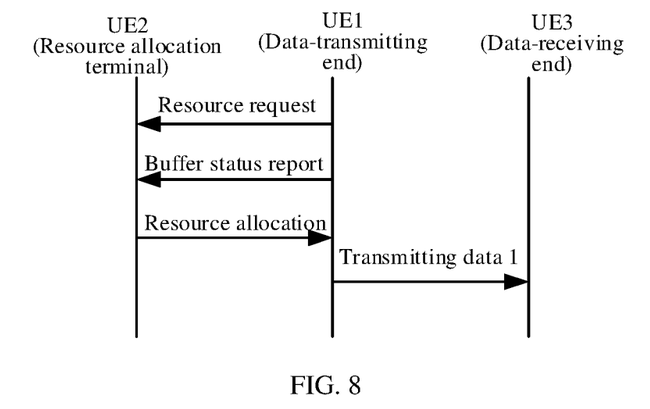
FIG. 8 is a schematic diagram showing a type of sidelink transmission.

In an example, as illustrated in FIG. 8, UE1, UE2, and UE3 form a communication group, in which UE2 is a group-head terminal, and UE1 and UE3 are group-member terminals. UE2 is responsible for allocating a sidelink transmission resource to each group-member terminal. When UE1 desires to transmit sidelink data to UE3, UE1 transmits a resource request and a buffer report to UE2. UE2 allocates a transmission resource to UE1. UE1 uses the transmission resource to transmit sidelink data 1 to UE3.

Figure 9:
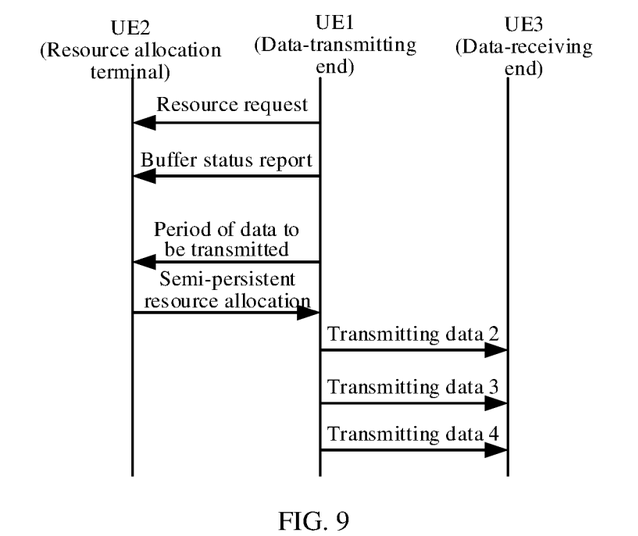
FIG. 9 is a schematic diagram showing another type of sidelink transmission.

As illustrated in FIG. 9, when UE1 has a periodic service that needs to be transmitted to UE3, UE1 applies for a transmission resource from UE2 and transmits parameters such as a period, an information size, or the like of data to be transmitted to UE2. UE2 allocates a semi-persistent transmission resource to UE1. UE1 uses the semi-persistent transmission resource allocated by UE2 to transmit sidelink data 2, 3 and 4 to UE3 separately.

In the embodiments of the present disclosure, when the terminal has the sidelink data to be transmitted, it may apply for the transmission resource from the central control node, and transmit assistance information to the central control node, including for example, the attribute parameter of the sidelink data to be transmitted, the available resource set, the power information, the destination address information, etc., to assist the central control node in allocating the transmission resource to the terminal.

Figure 10:
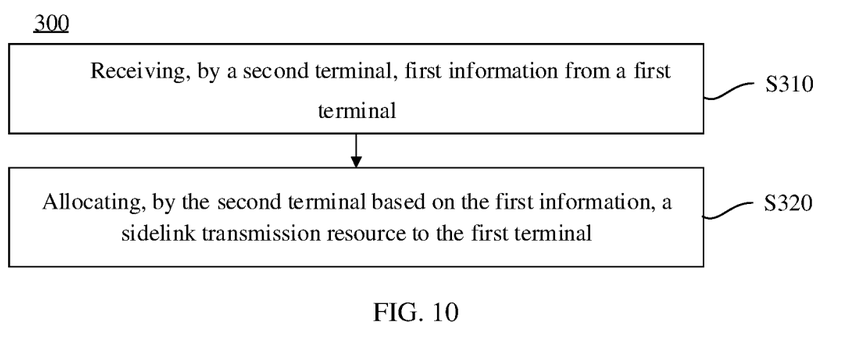
FIG. 10 is a schematic flowchart illustrating a resource allocation method according to an embodiment of the present disclosure.

FIG. 10 is a schematic flowchart illustrating a resource allocation method 300 according to another embodiment of the present disclosure. The method may optionally be, but is not limited to being, applied in the system as illustrated in FIG. 1. The method includes at least a part of the following content.

At S310, first information from a first terminal is received by a second terminal.

At S320, a sidelink transmission resource is allocated by the second terminal to the first terminal based on the first information.

Optionally, in an embodiment of the present disclosure, the first information includes an SR.

Optionally, in an embodiment of the present disclosure, the first information includes a BSR.

Optionally, in an embodiment of the present disclosure, the first information further includes relevant information of sidelink data to be transmitted by the first terminal.

Optionally, in an embodiment of the present disclosure, the relevant information of the sidelink data to be transmitted by the first terminal includes at least one of: period information of the sidelink data to be transmitted; delay information of the sidelink data to be transmitted; reliability information of the sidelink data to be transmitted; priority information of the sidelink data to be transmitted; or an information size of the sidelink data to be transmitted.

Optionally, in an embodiment of the present disclosure, the first information further includes terminal assistance information.

Optionally, in an embodiment of the present disclosure, the terminal assistance information includes at least one of: a bandwidth supported by the first terminal; a number of carriers supported by the first terminal; a number of channels supported by the first terminal; a maximum number of antenna ports supported by the first terminal; a maximum number of transmission layers of the first terminal; a modulation level supported by the first terminal; or a capability level of the first terminal.

Optionally, in an embodiment of the present disclosure, the first information further includes an available resource set.

Optionally, in an embodiment of the present disclosure, the first information further includes an unavailable resource set.

Optionally, in an embodiment of the present disclosure, the first information further includes a CBR.

Optionally, in an embodiment of the present disclosure, the first information further includes power information.

Optionally, in an embodiment of the present disclosure, the power information includes at least one of: information on maximum transmission power of the first terminal; information on power that the first terminal expects to receive; or information on power headroom of the first terminal.

Optionally, in an embodiment of the present disclosure, the first information further includes destination address information.

Optionally, in an embodiment of the present disclosure, the destination address information includes an identifier of a third terminal. The method further includes: allocating, by the second terminal, a transmission resource of sidelink feedback information to the first terminal. The transmission resource is used by the first terminal to transmit sidelink data to the third terminal.

Optionally, in an embodiment of the present disclosure, the first information further includes synchronization source information.

Optionally, in an embodiment of the present disclosure, the synchronization source information includes at least one of a type, reliability, and a measurement result of a synchronization source of the first terminal.

Optionally, in an embodiment of the present disclosure, the first information is carried by at least one of: SCI; a PSFCH; PC5-RRC signaling; or a MAC CE.

For specific examples of the method 300 performed by the second terminal according to any of the embodiments of the present disclosure, reference may be made to relevant description of the second terminal in the above method 200. For brevity, details thereof will be omitted herein.

Figure 11:
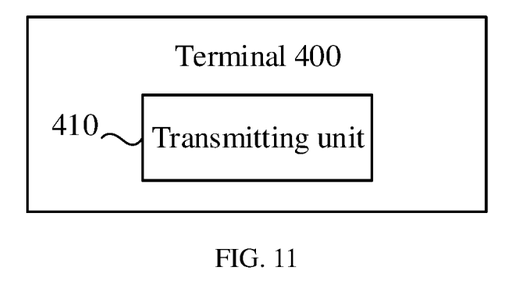
FIG. 11 is a schematic block diagram of a terminal according to an embodiment of the present disclosure.

FIG. 11 is a schematic block diagram of a terminal 400 according to an embodiment of the present disclosure. The terminal 400 may be the first terminal in the resource allocation method described above. The terminal may include a transmitting unit 410.

The transmitting unit 410 is configured to transmit first information to a second terminal. The first information instructs the second terminal to allocate a sidelink transmission resource to a first terminal.

Optionally, in an embodiment of the present disclosure, the first information includes an SR.

Optionally, in an embodiment of the present disclosure, the first information further includes a BSR.

Optionally, in an embodiment of the present disclosure, the first information further includes relevant information of sidelink data to be transmitted by the first terminal.

Optionally, in an embodiment of the present disclosure, the relevant information of the sidelink data to be transmitted by the first terminal includes at least one of: period information of the sidelink data to be transmitted; delay information of the sidelink data to be transmitted; reliability information of the sidelink data to be transmitted; priority information of the sidelink data to be transmitted; or an information size of the sidelink data to be transmitted.

Optionally, in an embodiment of the present disclosure, the first information further includes terminal assistance information.

Optionally, in an embodiment of the present disclosure, the terminal assistance information includes at least one of: a bandwidth supported by the first terminal; a number of carriers supported by the first terminal; a number of channels supported by the first terminal; a maximum number of antenna ports supported by the first terminal; a maximum number of transmission layers of the first terminal; a modulation level supported by the first terminal; or a capability level of the first terminal.

Optionally, in an embodiment of the present disclosure, the first information further includes an available resource set.

Optionally, in an embodiment of the present disclosure, the first information further includes an unavailable resource set.

Optionally, in an embodiment of the present disclosure, the first information further includes a CBR.

Optionally, in an embodiment of the present disclosure, the first information further includes power information.

Optionally, in an embodiment of the present disclosure, the power information includes at least one of: information on maximum transmission power of the first terminal; information on power that the first terminal expects to receive; or information on power headroom of the first terminal.

Optionally, in an embodiment of the present disclosure, the first information further includes destination address information.

Optionally, in an embodiment of the present disclosure, the destination address information includes an identifier of a third terminal. The third terminal is a receiver terminal of sidelink data to be transmitted by the first terminal.

Optionally, in an embodiment of the present disclosure, the first information further includes synchronization source information.

Optionally, in an embodiment of the present disclosure, the synchronization source information includes at least one of a type, reliability, and a measurement result of a synchronization source of the first terminal.

Optionally, in an embodiment of the present disclosure, the first information is carried by at least one of: SCI; a PSFCH; PC5-RRC signaling; or a MAC CE.

The terminal 400 according to any of the embodiments of the present disclosure is capable of realizing corresponding functions of the first terminal in the above method embodiments. For corresponding processes, functions, implementations, and beneficial effects of respective modules (sub-modules, units, or components, etc.) in the terminal 400, reference may be made to corresponding description in the above method embodiments, and thus details thereof will be omitted herein.

It should be noted that functions of respective modules (sub-modules, units, or components, etc.) in the terminal 400 according to any of the embodiments of the present disclosure may be implemented by different modules (sub-modules, units, or components, etc.) or by a same module (sub-module, unit, or component, etc.).

Figure 12:
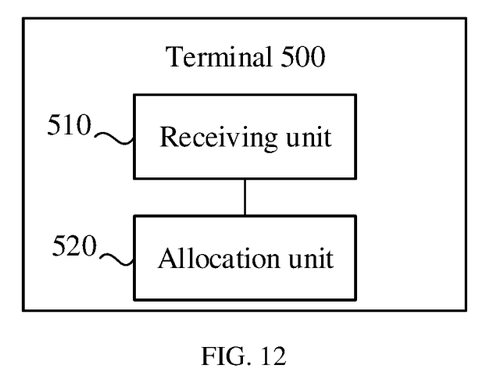
FIG. 12 is a schematic block diagram of a terminal according to another embodiment of the present disclosure.

FIG. 12 is a schematic block diagram of a terminal 500 according to another embodiment of the present disclosure. The terminal 500 may be the second terminal in the resource allocation method described above. The terminal may include a receiving unit 510 and an allocation unit 520.

The receiving unit 510 is configured to receive first information from a first terminal. The allocation unit 520 is configured to allocate, based on the first information, a sidelink transmission resource to the first terminal.

Optionally, in an embodiment of the present disclosure, the first information includes an SR.

Optionally, in an embodiment of the present disclosure, the first information includes a BSR.

Optionally, in an embodiment of the present disclosure, the first information further includes relevant information of sidelink data to be transmitted by the first terminal.

Optionally, in an embodiment of the present disclosure, the relevant information of the sidelink data to be transmitted by the first terminal includes at least one of: period information of the sidelink data to be transmitted; delay information of the sidelink data to be transmitted; reliability information of the sidelink data to be transmitted; priority information of the sidelink data to be transmitted; or an information size of the sidelink data to be transmitted.

Optionally, in an embodiment of the present disclosure, the first information further includes terminal assistance information.

Optionally, in an embodiment of the present disclosure, the terminal assistance information includes at least one of: a bandwidth supported by the first terminal; a number of carriers supported by the first terminal; a number of channels supported by the first terminal; a maximum number of antenna ports supported by the first terminal; a maximum number of transmission layers of the first terminal; a modulation level supported by the first terminal; or a capability level of the first terminal.

Optionally, in an embodiment of the present disclosure, the first information further includes an available resource set.

Optionally, in an embodiment of the present disclosure, the first information further includes an unavailable resource set.

Optionally, in an embodiment of the present disclosure, the first information further includes a CBR.

Optionally, in an embodiment of the present disclosure, the first information further includes power information.

Optionally, in an embodiment of the present disclosure, the power information includes at least one of: information on maximum transmission power of the first terminal; information on power that the first terminal expects to receive; or information on power headroom of the first terminal.

Optionally, in an embodiment of the present disclosure, the first information further includes destination address information.

Optionally, in an embodiment of the present disclosure, the destination address information includes an identifier of a third terminal. The allocation unit 520 is further configured to allocate a transmission resource of sidelink feedback information to the first terminal. The transmission resource is used by the first terminal to transmit sidelink data to the third terminal.

Optionally, in an embodiment of the present disclosure, the first information further includes synchronization source information.

Optionally, in an embodiment of the present disclosure, the synchronization source information includes at least one of a type, reliability, and a measurement result of a synchronization source of the first terminal.

Optionally, in an embodiment of the present disclosure, the first information is carried by at least one of: SCI; a PSFCH; PC5-RRC signaling; or a MAC CE.

The terminal 500 according to any of the embodiments of the present disclosure is capable of realizing corresponding functions of the second terminal in the above method embodiments. For corresponding processes, functions, implementations, and beneficial effects of respective modules (sub-modules, units, or components, etc.) in the terminal 500, reference may be made to corresponding description in the above method embodiments, and thus details thereof will be omitted herein.

It should be noted that functions of respective modules (sub-modules, units, or components, etc.) in the terminal 500 according to any of the embodiments of the present disclosure may be implemented by different modules (sub-modules, units, or components, etc.) or by a same module (sub-module, unit, or component, etc.).

Figure 13:
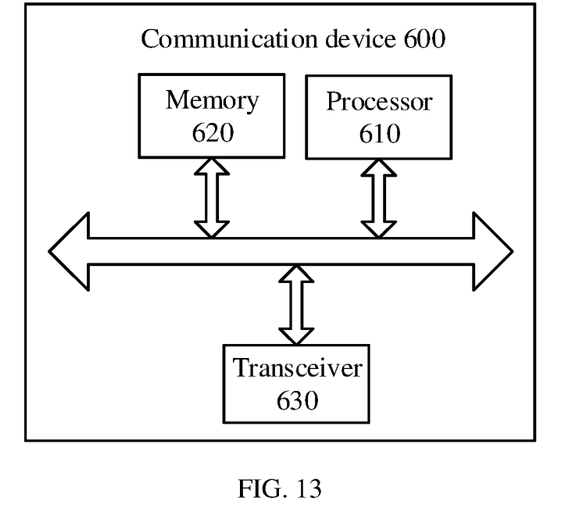
FIG. 13 is a schematic block diagram of a communication device according to an embodiment of the present disclosure.

FIG. 13 is a schematic diagram showing a structure of a communication device 600 according to an embodiment of the present disclosure. The communication device 600 illustrated in FIG. 13 includes a processor 610. The processor 610 is configured to invoke and execute a computer program from a memory to perform the method according to any of the embodiments of the present disclosure.

Optionally, as illustrated in FIG. 13, the communication device 600 may further include a memory 620. The processor 610 may invoke and execute a computer program from the memory 620 to perform the method according to any of the embodiments of the present disclosure.

Here, the memory 620 may be a separate component independent of the processor 610, or may be integrated into the processor 610.

Optionally, as illustrated in FIG. 13, the communication device 600 may further include a transceiver 630. The processor 610 may control the transceiver 630 to communicate with other devices, specifically, to transmit information or data to other devices, or receive information or data transmitted by other devices.

Here, the transceiver 630 may include a transmitter and a receiver. The transceiver 630 may further include one or more antennas.

Optionally, the communication device 600 may specifically be the first terminal or the second terminal according to any of the embodiments of the present disclosure. The communication device 600 may implement corresponding processes implemented by the first terminal or the second terminal in the method according to any of the embodiments of the present disclosure. For brevity, details thereof will be omitted herein.

Figure 14:
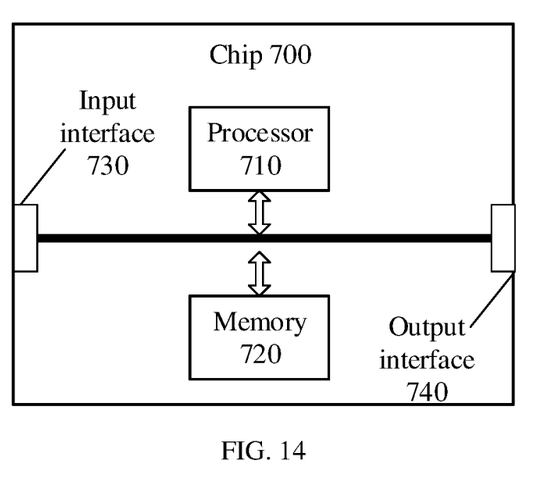
FIG. 14 is a schematic block diagram of a chip according to an embodiment of the present disclosure.

FIG. 14 is a schematic diagram showing a structure of a chip 700 according to an embodiment of the present disclosure. The chip 700 illustrated in FIG. 14 includes a processor 710. The processor 710 may invoke and execute a computer program from the memory to perform the method according to any of the embodiments of the present disclosure.

Optionally, as illustrated in FIG. 14, the chip 700 may further include a memory 720. The processor 710 may invoke and execute a computer program from the memory 720 to perform the method according to any of the embodiments of the present disclosure.

Here, the memory 720 may be a separate component independent of the processor 710, or may be integrated into the processor 710.

Optionally, the chip 700 may further include an input interface 730. The processor 710 can control the input interface 730 to communicate with other devices or chips, specifically, to obtain information or data transmitted by other devices or chips.

Optionally, the chip 700 may further include an output interface 740. The processor 710 can control the output interface 740 to communicate with other devices or chips, specifically, to output information or data to other devices or chips.

Optionally, the chip can be applied to the first terminal or the second terminal according to any of the embodiments of the present disclosure. The chip can implement corresponding processes implemented by the first terminal or the second terminal in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

The processor can be a general purpose processor, a Digital Signal Processor (DSP), a Field Programmable Gate Array (FPGA), an Application Specific Integrated Circuit (ASIC) or another programmable logic device, a transistor logic device, or a discrete hardware component. The general purpose processor may be a microprocessor or any conventional processor.

The memory mentioned above may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM).

It can be appreciated that the above memories are exemplary only, rather than limiting the present disclosure. For example, the memory in the embodiment of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

Figure 15:
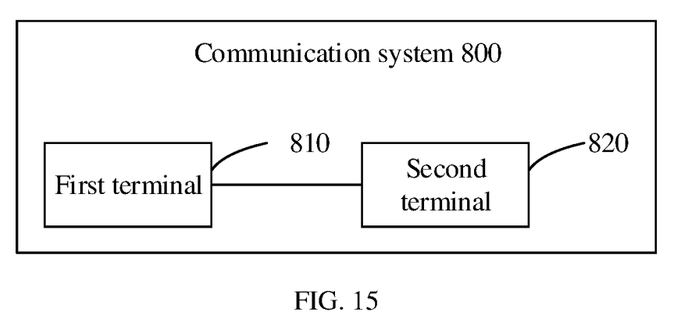
FIG. 15 is a schematic block diagram of a communication system according to an embodiment of the present disclosure.

FIG. 15 is a schematic block diagram of a communication system 800 according to an embodiment of the present disclosure. As illustrated in FIG. 15, the communication system 800 includes a first terminal 810 and a second terminal 820.

The first terminal 810 is configured to transmit first information to the second terminal. The first information instructs the second terminal to allocate a sidelink transmission resource to the first terminal. The second terminal 820 is configured to: receive the first information from the first terminal; and allocate the sidelink transmission resource to the first terminal based on the first information.

Here, according to above relevant description of the first information, the first terminal 810 can be configured to implement the corresponding functions implemented by the first terminal in the above method, and the second terminal 810 can be configured to implement corresponding functions implemented by the second terminal in the above method. For brevity, repeated description is omitted herein.

The above embodiments may be implemented in whole or in part by software, hardware, firmware, or any combination thereof. When implemented by software, the embodiments may be implemented in whole or in part in the form of a computer program product. The computer program product includes one or more computer instructions. When the one or more computer program instructions are loaded and executed on a computer, all or part of the processes or functions according to the embodiments of the present disclosure are generated. The computer may be a general purpose computer, a dedicated computer, a computer network, or another programmable apparatus. The one or more computer instructions may be stored in a computer-readable storage medium, or transmitted from one computer-readable storage medium to another computer-readable storage medium. For example, the one or more computer instructions may be transmitted from one web site, computer, server, or data center to another web site, computer, server, or data center via a wired (e.g., coaxial cable, optical fiber, Digital Subscriber Line (DSL)) or wireless (e.g., infrared, wireless, microwave, etc.) connection. The computer-readable storage medium can be any available medium that can be accessed by a computer, or can be a data storage device such as a server or a data center integrated with one or more available media. The available media may be magnetic media (e.g., floppy disks, hard disks, magnetic tapes), optical media (e.g., Digital Video Discs (DVD)), or semiconductor media (e.g., Solid State Disks (SSDs)), etc.

It should be understood that, in various embodiments of the present disclosure, numerical values of the sequence numbers of the above processes do not imply an execution sequence. The execution sequence of the processes shall be determined by their functions and internal logic, and shall not constitute any limitation to implementation processes of the embodiments of the present disclosure.

Those skilled in the art can clearly understand that, for the sake of convenience and conciseness of description, regarding the specific operation processes of the systems, apparatuses, and units described above, reference can be made to the corresponding processes in the above method embodiments, and repeated description is omitted herein.

While only specific embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of the present disclosure as defined by the claims as attached.

What is claimed is:

1. A resource allocation method, comprising:
transmitting, by a first terminal, first information to a second terminal, the first information instructing the second terminal to allocate a sidelink transmission resource to the first terminal; wherein
the first information comprises a Scheduling Request (SR), and the SR is carried in a physical sidelink feedback channel (PSFCH) transmitted from the first terminal to the second terminal; and
the first information further comprises destination address information, wherein the destination address information comprises an identifier of a third terminal, the third terminal being a receiver terminal of sidelink data to be transmitted by the first terminal.

2. The method according to claim 1, wherein the first information further comprises a Buffer Status Report (BSR).

3. The method according to claim 1, wherein the first information further comprises relevant information of the sidelink data to be transmitted by the first terminal,
wherein the relevant information of the sidelink data to be transmitted by the first terminal comprises at least one of:
period information of the sidelink data to be transmitted;
delay information of the sidelink data to be transmitted;
reliability information of the sidelink data to be transmitted;
priority information of the sidelink data to be transmitted; or
an information size of the sidelink data to be transmitted.

4. The method according to claim 1, wherein the first information further comprises terminal assistance information,
wherein the terminal assistance information comprises at least one of:
a bandwidth supported by the first terminal;
a number of carriers supported by the first terminal;
a number of channels supported by the first terminal;
a maximum number of antenna ports supported by the first terminal;
a maximum number of transmission layers of the first terminal;
a modulation level supported by the first terminal; or
a capability level of the first terminal.

5. The method according to claim 1, wherein the first information further comprises at least one of:
an available resource set;
an unavailable resource set;
a Channel Busy Ratio (CBR); or
power information.

6. The method according to claim 5, wherein the power information comprises at least one of:
information on maximum transmission power of the first terminal;
information on power that the first terminal expects to receive; or
information on power headroom of the first terminal.

7. The method according to claim 1, wherein the first information further comprises synchronization source information, wherein the synchronization source information comprises at least one of a type, reliability, and a measurement result of a synchronization source of the first terminal.

8. The method according to claim 1, wherein the first information is carried by at least one of:
Sidelink Control Information (SCI);
a PSFCH;
PC5-Radio Resource Control (RRC) signaling; or
a Media Access Control (MAC) Control Element (CE).

9. A non-transitory computer-readable storage medium, having a computer program stored thereon, wherein the computer program causes a computer to perform the method according to claim 1.

10. The method according to claim 1, wherein sidelink feedback information corresponding to the sidelink data to be transmitted by the first terminal is transmitted by the third terminal to the second terminal directly.

11. A resource allocation method, comprising:
receiving, by a second terminal, first information from a first terminal; and
allocating, by the second terminal based on the first information, a sidelink transmission resource to the first terminal; wherein
the first information comprises a Scheduling Request (SR), and the SR is carried in a physical sidelink feedback channel (PSFCH) received by the second terminal from the first terminal; and
the first information further comprises destination address information, the destination address information comprising an identifier of a third terminal.

12. The method according to claim 11, wherein the first information further comprises a Buffer Status Report (BSR).

13. The method according to claim 11, wherein the first information further comprises relevant information of sidelink data to be transmitted by the first terminal,
wherein the relevant information of the sidelink data to be transmitted by the first terminal comprises at least one of:
period information of the sidelink data to be transmitted;
delay information of the sidelink data to be transmitted;
reliability information of the sidelink data to be transmitted;
priority information of the sidelink data to be transmitted; or
an information size of the sidelink data to be transmitted.

14. The method according to claim 11, wherein the first information further comprises terminal assistance information,
wherein the terminal assistance information comprises at least one of:
a bandwidth supported by the first terminal;
a number of carriers supported by the first terminal;
a number of channels supported by the first terminal;
a maximum number of antenna ports supported by the first terminal;
a maximum number of transmission layers of the first terminal;
a modulation level supported by the first terminal; or
a capability level of the first terminal.

15. The method according to any claim 11, wherein the first information further comprises at least one of:
an available resource set;
an unavailable resource set;
a Channel Busy Ratio (CBR); or
power information.

16. The method according to claim 11,
wherein the method further comprises:
allocating, by the second terminal, a transmission resource of sidelink feedback information to the first terminal, the transmission resource being used by the first terminal to transmit sidelink data to the third terminal.

17. The method according to claim 16, wherein the sidelink feedback information is transmitted by the third terminal device to the second terminal device directly.

18. The method according to claim 11, wherein the first information further comprises synchronization source information, and the synchronization source information comprises at least one of a type, reliability, and a measurement result of a synchronization source of the first terminal.

19. A terminal, comprising:
a memory having a computer program stored thereon; and
a processor configured to invoke and execute the computer program stored in the memory to:
transmit first information to a second terminal, the first information instructing the second terminal to allocate a sidelink transmission resource to the first terminal; wherein
the first information comprises a Scheduling Request (SR), and the SR is carried in a physical sidelink feedback channel (PSFCH) transmitted to the second terminal; and
the first information further comprises destination address information, wherein the destination address information comprises an identifier of a third terminal, the third terminal being a receiver terminal of sidelink data to be transmitted by the terminal.

20. The terminal according to claim 19, wherein sidelink feedback information corresponding to the sidelink data to be transmitted by the terminal is transmitted by the third terminal to the second terminal directly.

* * * * *